United States Patent
Von Novak, III et al.

(10) Patent No.: US 10,291,075 B2
(45) Date of Patent: May 14, 2019

(54) OVER VOLTAGE PROTECTION DETECTION

(71) Applicant: QUALCOMM Incorporated, San Diego, CA (US)

(72) Inventors: William Henry Von Novak, III, San Diego, CA (US); Mark White, II, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 15/438,985

(22) Filed: Feb. 22, 2017

(65) Prior Publication Data

US 2018/0241249 A1    Aug. 23, 2018

(51) Int. Cl.
*H02J 50/12*    (2016.01)
*H02J 50/80*    (2016.01)
*H02J 7/02*    (2016.01)

(52) U.S. Cl.
CPC .............. *H02J 50/12* (2016.02); *H02J 7/025* (2013.01); *H02J 50/80* (2016.02)

(58) Field of Classification Search
None
See application file for complete search history.

(56) References Cited

U.S. PATENT DOCUMENTS

| | | | | |
|---|---|---|---|---|
| 9,065,276 | B2* | 6/2015 | Kim | H02H 3/20 |
| 2010/0072285 | A1* | 3/2010 | Nishijima | G06K 19/0707 |
| | | | | 235/492 |
| 2013/0099585 | A1* | 4/2013 | Von Novak | H01F 38/14 |
| | | | | 307/104 |
| 2013/0099734 | A1* | 4/2013 | Lee | H02J 7/007 |
| | | | | 320/108 |
| 2013/0176652 | A1* | 7/2013 | Kim | H02H 3/20 |
| | | | | 361/86 |
| 2013/0342161 | A1* | 12/2013 | Byun | H04B 5/0037 |
| | | | | 320/108 |
| 2014/0152117 | A1 | 6/2014 | Sankar | |

(Continued)

FOREIGN PATENT DOCUMENTS

| | | |
|---|---|---|
| JP | 2014171278 A | 9/2014 |
| WO | 2016019159 A1 | 2/2016 |

OTHER PUBLICATIONS

Co-pending U.S. Appl. No. 14/730,066, filed Jun. 3, 2015.

*Primary Examiner* — Jared Fureman
*Assistant Examiner* — James P Evans
(74) *Attorney, Agent, or Firm* — Patterson & Sheridan, L.L.P.

(57) ABSTRACT

Certain aspects of the present disclosure relate to methods and apparatus for detecting, by a wireless power transmitter, an over voltage protection at a wireless power receiver. Certain aspects of the present disclosure provide a wireless power transmitter. The wireless power transmitter includes a resonator configured to generate a wireless field for wirelessly transferring power to a wireless power receiver. The wireless power transmitter further includes an impedance detector configured to measure an impedance of the resonator. The wireless power transmitter further includes a controller configured to detect operation of an over voltage protection mode of the wireless power receiver based on a frequency of change in impedance as measured by the impedance detector.

27 Claims, 5 Drawing Sheets

(56) References Cited

U.S. PATENT DOCUMENTS

| | | | |
|---|---|---|---|
| 2015/0372493 A1* | 12/2015 | Sankar | H02J 7/025 307/104 |
| 2016/0011276 A1* | 1/2016 | Goma | G01R 31/00 324/764.01 |
| 2016/0056639 A1 | 2/2016 | Mao | |
| 2016/0118844 A1 | 4/2016 | Park et al. | |
| 2016/0336816 A1* | 11/2016 | Mach | H02J 50/80 |
| 2017/0093167 A1* | 3/2017 | Von Novak, III | H02J 50/12 |
| 2017/0093168 A1* | 3/2017 | Von Novak, III | H02J 5/005 |
| 2017/0093225 A1* | 3/2017 | Murayama | H02J 50/90 |
| 2017/0256956 A1* | 9/2017 | Irish | H02J 5/00 |

* cited by examiner

OVER VOLTAGE PROTECTION DETECTION

TECHNICAL FIELD

The present disclosure relates generally to wireless power transfer, and in particular to detecting when a wireless power receiver is operating in an over voltage protection mode.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, medical implants, and the like. While battery technology has improved, battery-powered electronic devices increasingly require and consume greater amounts of power. As such, these devices constantly require recharging. Rechargeable devices are often charged via wired connections that require cables or other similar connectors that are physically connected to a power supply. Cables and similar connectors may sometimes be inconvenient or cumbersome and have other drawbacks. Wireless power transfer systems, for example, may allow users to charge and/or power electronic devices without physical, electrical connections, thus reducing the number of components required for operation of the electronic devices and simplifying the use of the electronic device.

For example, some battery powered devices, such as medical implants (e.g., pacemakers, neuromodulation devices, insulin pumps, etc.) may be located/positioned in areas where replacing the battery is not always feasible (e.g., in a body, such as, a human body). For example, to change a battery for a medical implant, surgery may need to be performed, which is risky. Accordingly, it may be safer to charge such devices wirelessly.

Further, some electronic devices may not be battery powered, but it still may be beneficial to utilize wireless power transfer to power such devices. In particular, the use of wireless power may eliminate the need for cords/cables to be attached to the electronic devices, which may be inconvenient and aesthetically displeasing.

Different electronic devices may have different shapes, sizes, and power requirements. There is flexibility in having different sizes and shapes in the components (e.g., magnetic coil, charging plate, etc.) that make up a wireless power transmitter and/or a wireless power receiver in terms of industrial design and support for a wide range of devices.

SUMMARY

Certain aspects of the present disclosure provide a wireless power transmitter. The wireless power transmitter includes a resonator configured to generate a wireless field for wirelessly transferring power to a wireless power receiver. The wireless power transmitter further includes an impedance detector configured to measure an impedance of the resonator. The wireless power transmitter further includes a controller configured to detect operation of an over voltage protection mode of the wireless power receiver based on a frequency of change in impedance as measured by the impedance detector.

Certain aspects of the present disclosure provide a method for detecting an over voltage protection mode of a wireless power receiver. The method includes generating a wireless field for wirelessly transferring power to a wireless power receiver using a resonator. The method further includes measuring an impedance of the resonator. The method further includes detecting operation of an over voltage protection mode of the wireless power receiver based on a frequency of change of the measured impedance.

Certain aspects of the present disclosure provide a wireless power transmitter. The wireless power transmitter includes means for generating a wireless field for wirelessly transferring power to a wireless power receiver. The wireless power transmitter further includes means for measuring an impedance of the means for generating. The wireless power transmitter further includes means for detecting operation of an over voltage protection mode of the wireless power receiver based on a frequency of change of the measured impedance.

The following detailed description and accompanying drawings provide a better understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. In the accompanying drawings.

DETAILED DESCRIPTION

Figure 1:
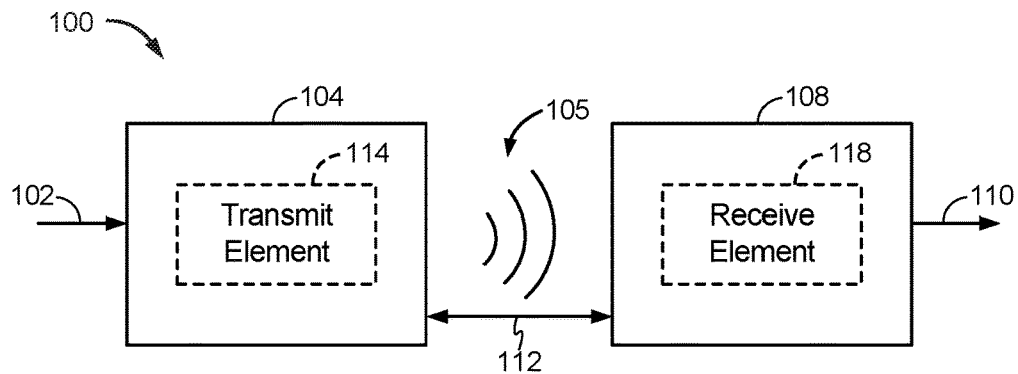
FIG. 1 is a functional block diagram of a wireless power transfer system in accordance with an illustrative aspect.

Drawing elements that are common among the following figures may be identified using the same reference numerals.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "power receiving element" to achieve power transfer.

FIG. 1 is a functional block diagram of a wireless power transfer system 100, in accordance with an illustrative aspect. Input power 102 may be provided to a transmitter 104 from a power source (not shown in this figure) to generate a wireless (e.g., magnetic or electromagnetic) field 105 for performing energy transfer. A receiver 108 may couple to the wireless field 105 and generate output power 110 for storing or consumption by a device (not shown in this figure) coupled to the output power 110. The transmitter 104 and the receiver 108 may be separated by a distance 112. The transmitter 104 may include a power transmitting element 114 for transmitting/coupling energy to the receiver 108. The receiver 108 may include a power receiving element 118 for receiving or capturing/coupling energy transmitted from the transmitter 104.

In one illustrative aspect, the transmitter 104 and the receiver 108 may be configured according to a mutual resonant relationship. When the resonant frequency of the receiver 108 and the resonant frequency of the transmitter 104 are substantially the same or very close, transmission losses between the transmitter 104 and the receiver 108 are reduced. As such, wireless power transfer may be provided over larger distances. Resonant inductive coupling techniques may thus allow for improved efficiency and power transfer over various distances and with a variety of inductive power transmitting and receiving element configurations.

In certain aspects, the wireless field 105 may correspond to the "near field" of the transmitter 104. The near-field may correspond to a region in which there are strong reactive fields resulting from the currents and charges in the power transmitting element 114 that minimally radiate power away from the power transmitting element 114. The near-field may correspond to a region that is within about one wavelength (or a fraction thereof) of the power transmitting element 114. Conversely, the far field may correspond to a region that is greater than about one wavelength of the power transmitting element 114.

In certain aspects, efficient energy transfer may occur by coupling a large portion of the energy in the wireless field 105 to the power receiving element 118 rather than propagating most of the energy in an electromagnetic wave to the far field.

In certain implementations, the transmitter 104 may output a time varying magnetic (or electromagnetic) field with a frequency corresponding to the resonant frequency of the power transmitting element 114. When the receiver 108 is within the wireless field 105, the time varying magnetic (or electromagnetic) field may induce a current in the power receiving element 118. As described above, if the power receiving element 118 is configured as a resonant circuit to resonate at the frequency of the power transmitting element 114, energy may be efficiently transferred. An alternating current (AC) signal induced in the power receiving element 118 may be rectified to produce a direct current (DC) signal that may be provided to charge or to power a load.

Figure 2:
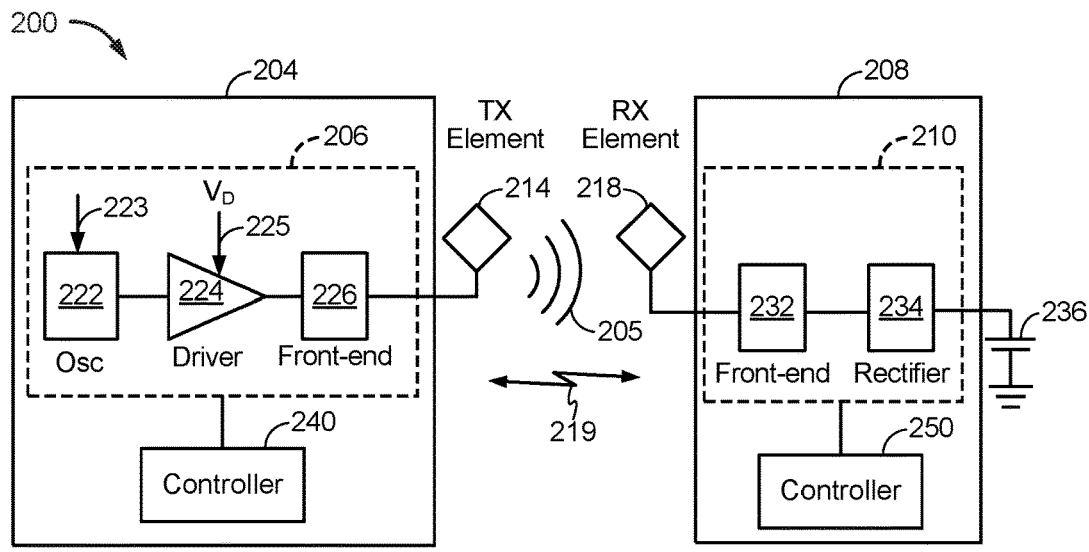
FIG. 2 is a functional block diagram of a wireless power transfer system in accordance with an illustrative aspect.

FIG. 2 is a functional block diagram of a wireless power transfer system 200, in accordance with another illustrative aspect. The system 200 may include a transmitter 204 and a receiver 208. The transmitter 204 (also referred to herein as power transfer unit, PTU) may include transmit circuitry 206 that may include an oscillator 222, a driver circuit 224, and a front-end circuit 226. The oscillator 222 may be configured to generate an oscillator signal (e.g., an oscillating signal) at a desired frequency (e.g., fundamental frequency) that may adjust in response to a frequency control signal 223. The oscillator 222 may provide the oscillator signal to the driver circuit 224. The driver circuit 224 may be configured to drive the power transmitting element 214 at, for example, a resonant frequency of the power transmitting element 214 based on an input voltage signal (VD) 225. The driver circuit 224 may be a switching amplifier configured to receive a square wave from the oscillator 222 and output as a driving signal output a sine wave.

The front-end circuit 226 may include a filter circuit configured to filter out harmonics or other unwanted frequencies. The front-end circuit 226 may include a matching circuit configured to match the impedance of the transmitter 204 to the impedance of the power transmitting element 214. As will be explained in more detail below, the front-end circuit 226 may include a tuning circuit to create a resonant circuit with the power transmitting element 214. As a result of driving the power transmitting element 214, the power transmitting element 214 may generate a wireless field 205 to wirelessly output power at a level sufficient for charging a battery 236, or otherwise powering a load.

The transmitter 204 may further include a controller 240 operably coupled to the transmit circuitry 206 and configured to control one or more aspects of the transmit circuitry 206, or accomplish other operations relevant to managing the transfer of power. The controller 240 may be a microcontroller or a processor. The controller 240 may be implemented as an application-specific integrated circuit (ASIC). The controller 240 may be operably connected, directly or indirectly, to each component of the transmit circuitry 206. The controller 240 may be further configured to receive information from each of the components of the transmit circuitry 206 and perform calculations based on the received information. The controller 240 may be configured to generate control signals (e.g., signal 223) for each of the components that may adjust the operation of that component. As such, the controller 240 may be configured to adjust or manage the power transfer based on a result of the operations performed by it. The transmitter 204 may further include a memory (not shown) configured to store data, for example, such as instructions for causing the controller 240 to perform particular functions, such as those related to management of wireless power transfer.

The receiver 208 (also referred to herein as power receiving unit, PRU) may include receive circuitry 210 that may include a front-end circuit 232 and a rectifier circuit 234. The front-end circuit 232 may include matching circuitry configured to match the impedance of the receive circuitry 210 to the impedance of the power receiving element 218. As will be explained below, the front-end circuit 232 may further include a tuning circuit to create a resonant circuit with the power receiving element 218. The rectifier circuit 234 may generate a DC power output from an AC power input to charge the battery 236, as shown in FIG. 2. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236. In certain aspects, the transmitter 204 may be configured to generate a predominantly non-radiative field with a direct field coupling coefficient (k) for providing energy transfer. Receiver 208 may directly couple to the wireless field 205 and may generate an output power for storing or consumption by a battery (or load) 236 coupled to the output or receive circuitry 210.

The receiver 208 may further include a controller 250 configured similarly to the transmit controller 240 as described above for managing one or more aspects of the wireless power receiver 208. In certain aspects, the controller 250 may be part of a power management integrated circuit (PMIC). The receiver 208 may further include a memory (not shown) configured to store data, for example, such as instructions for causing the controller 250 to perform particular functions, such as those related to management of wireless power transfer.

As discussed above, transmitter 204 and receiver 208 may be separated by a distance and may be configured according to a mutual resonant relationship to minimize transmission losses between the transmitter 204 and the receiver 208.

Figure 3:
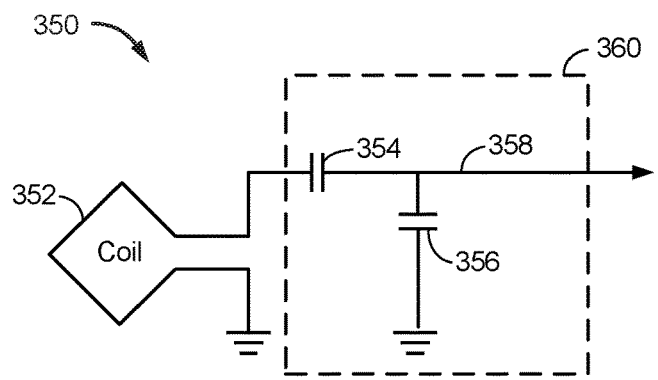
FIG. 3 is a schematic diagram of a portion of the transmit circuitry or the receive circuitry of FIG. 2, in accordance with illustrative aspects.

FIG. 3 is a schematic diagram of a portion of the transmit circuitry 206 or the receive circuitry 210 of FIG. 2, in accordance with illustrative aspects. As illustrated in FIG. 3, transmit or receive circuitry 350 may include a power transmitting or receiving element 352 and a tuning circuit 360. The power transmitting or receiving element 352 may also be referred to or be configured as an antenna or a "loop" antenna. The term "antenna" generally refers to a component that may wirelessly output or receive energy for coupling to another antenna. The power transmitting or receiving element 352 may also be referred to herein or be configured as a "magnetic" antenna, or an induction coil, a resonator, or a portion of a resonator. The power transmitting or receiving element 352 may also be referred to as a coil or resonator of a type that is configured to wirelessly output or receive power. As used herein, the power transmitting or receiving element 352 is an example of a "power transfer component" of a type that is configured to wirelessly output and/or receive power. The power transmitting or receiving element 352 may include an air core or a physical core such as a ferrite core (not shown in this figure). In some aspects, the term resonator, as used herein may refer to the entire resonant circuit including an inductor in combination with the capacitance of one or more capacitors of the resonant circuit.

When the power transmitting or receiving element 352 is configured as a resonant circuit or resonator with tuning circuit 360, the resonant frequency of the power transmitting or receiving element 352 may be based on the inductance and capacitance. Inductance may be simply the inductance created by a coil and/or other inductor forming the power transmitting or receiving element 352. Capacitance (e.g., a capacitor) may be provided by the tuning circuit 360 to create a resonant structure at a desired resonant frequency. As a non limiting example, the tuning circuit 360 may comprise a capacitor 354 and a capacitor 356, which may be added to the transmit and/or receive circuitry 350 to create a resonant circuit.

The tuning circuit 360 may include other components to form a resonant circuit with the power transmitting or receiving element 352. As another non limiting example, the tuning circuit 360 may include a capacitor (not shown) placed in parallel between the two terminals of the circuitry 350. Still other designs are possible. In some aspects, the tuning circuit in the front-end circuit 226 may have the same design (e.g., 360) as the tuning circuit in front-end circuit 232. In other aspects, the front-end circuit 226 may use a tuning circuit design different than in the front-end circuit 232.

For power transmitting elements, the signal 358, with a frequency that substantially corresponds to the resonant frequency of the power transmitting or receiving element 352, may be an input to the power transmitting or receiving element 352. For power receiving elements, the signal 358, with a frequency that substantially corresponds to the resonant frequency of the power transmitting or receiving element 352, may be an output from the power transmitting or receiving element 352. Although aspects disclosed herein may be generally directed to resonant wireless power transfer, persons of ordinary skill will appreciate that aspects disclosed herein may be used in non-resonant implementations for wireless power transfer.

In certain aspects, the induced voltage at a wireless power receiving device with a wireless power receiver (e.g., receiver 208) due to a wireless field (e.g., wireless field 205 generated by a wireless power transmitter (e.g., transmitter 204) may be variable. For example, the coupling between the wireless power receiver 208 and the wireless power transmitter 204 may vary due to distance, orientation, material, etc., between the receiver 208 and the transmitter 204, leading to varying induced voltage at the wireless power receiver 208. The voltage may be induced at a resonator (e.g., including an antenna and tuning capacitors) of the receiver 208.

In certain aspects, the receiver 208 may have a threshold voltage level (e.g., a threshold voltage where if the induced voltage is above the threshold voltage level, it may damage the receiver 208 or objects near the receiver 208) for the induced voltage at the receiver 208. Accordingly, the receiver 208 may implement over voltage protection (OVP). As one example, when the induced voltage at the receiver 208 is above a threshold voltage level, a circuit implementing over voltage protection (e.g., switch, transistor, controller 250, etc.) is configured to, for example, short the terminals of the antenna or adjust a tuning of the resonator of the receiver 208 (e.g., away from a resonant frequency of the transmitter 204), thereby dropping induced voltage.

Figure 4:
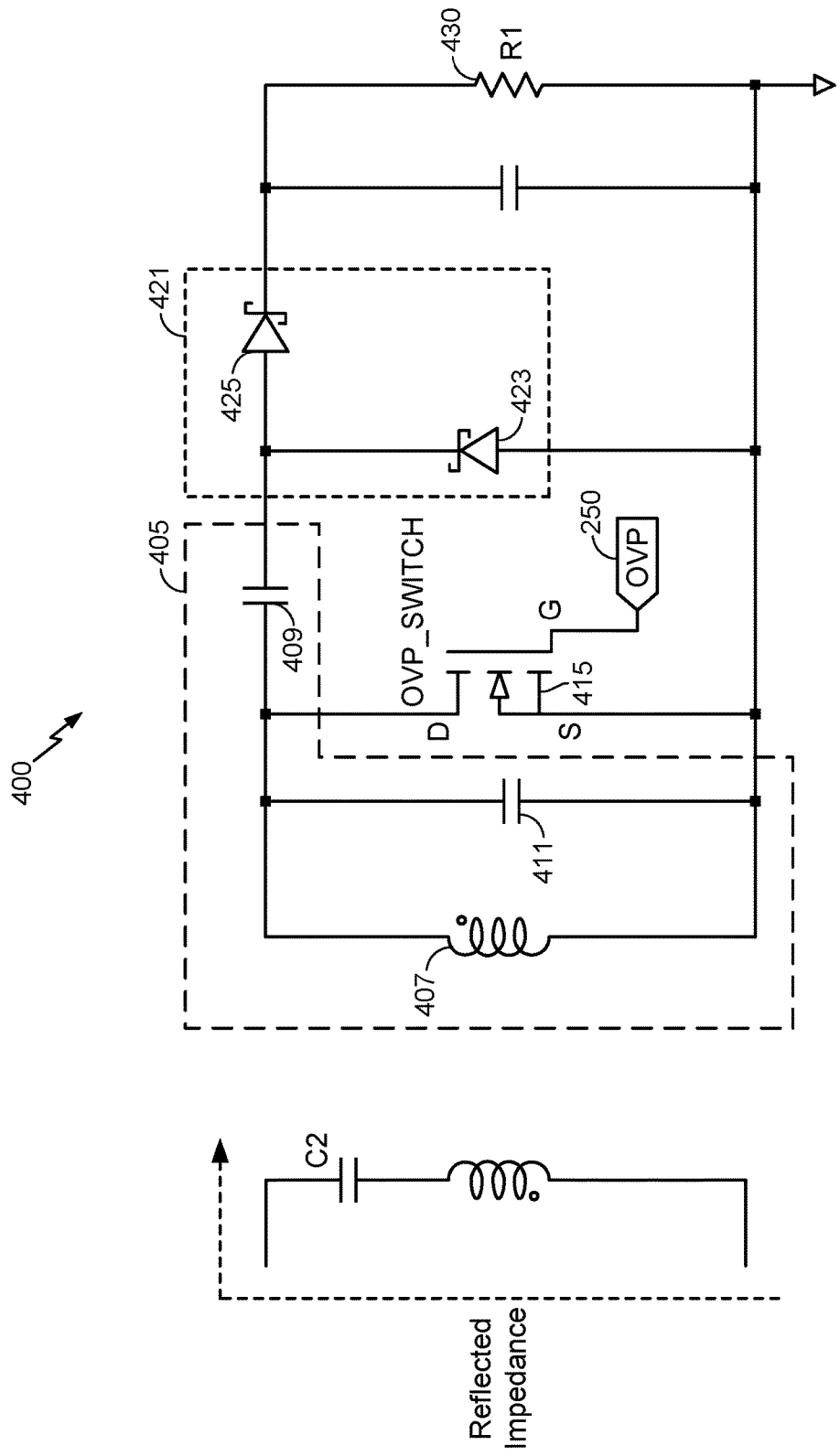
FIG. 4 illustrates a circuit diagram of an example of a wireless power receiver that implements over voltage protection, in accordance with illustrative aspects.

For example, FIG. 4 illustrates a circuit diagram of an example of a wireless power receiver 400 that implements over voltage protection, in accordance with illustrative aspects. In some aspects, receiver 400 may correspond to receiver 208. As shown receiver 400 includes a resonator 405. The resonator 405 includes an inductor (e.g., antenna) 407 and tuning capacitors 409 and 411. The receiver 400 further includes a switch 415. When closed, the switch 415 shorts the terminals of the inductor 407, thereby dropping any induced voltage on the resonator 405. Accordingly, closing the switch 415 operates the receiver 400 in an over voltage protection state or mode where induced voltage is dropped. When the switch 415 is open, the receiver 400 operates normally (i.e., not in over voltage protection mode). Accordingly, selective opening and closing of the switch is used to control whether the receiver 400 is operating in over voltage protection mode or not. The opening and closing of the switch may be controlled by a controller (e.g., controller 250, circuit, integrated circuit, etc.) based on the induced voltage level at the resonator 405 as described herein. For example, a gate terminal of the switch 415 may be coupled to the controller, and the controller may generate and apply a signal to selectively open and close the switch 415. In some aspects, the controller includes a voltage measuring circuit or is coupled to a voltage measuring circuit that measures the induced voltage by measuring the induced voltage at the resonator 405. In some aspects, the voltage measuring circuit measures the induced voltage my measuring a DC voltage output of a rectifier of the receiver 400. For example, as shown, receiver 400 includes a rectifier 421 comprising diodes 423 and 425. In some aspects, the output of the rectifier 421 is coupled to a load 430 having a resistance R1 represented by a resistor. In some aspects, the load 430 may be a power management integrated circuit (PMIC), battery, etc.

In some aspects (e.g., other example of over voltage protection circuitry), the receiver 400 may include additional or alternative switches (e.g., controlled by controller 250) that are used to selectively couple and decouple tuning capacitors (e.g., tuning capacitors 409 and 411) from the resonator 405 to change the resonant frequency of the resonator 405 and alter the induced voltage. For example, when the receiver 400 is in over voltage protection mode, the switch may selectively couple and/or decouple tuning capacitors to lower the induced voltage at the resonator 405. In some aspects, the tuning capacitors may comprise variable capacitors. The controller may control the tuning capacitors to change the resonant frequency of the resonator 405 and alter the induced voltage. For example, when the receiver 400 is in over voltage protection mode, the controller may adjust the capacitance of the tuning capacitors to lower the induced voltage at the resonator 405.

In certain aspects, when the receiver 208 is in over voltage protection mode, it may be desirable for the transmitter 204 to modify the strength of the wireless power field generated by the transmitter 204, so as to lower an induced voltage at the receiver 208 so it no longer needs to be in over voltage protection mode. In particular, if the transmitter 204 does not modify the strength of the wireless power field and the receiver 208 enters over voltage protection mode, the induced voltage at the receiver 208 may drop temporarily. However, once the induced voltage at the receiver 208 drops, the receiver 208 may operate in a normal mode again, and the induced voltage may again rise above the threshold voltage. To avoid this cycle, the transmitter 204 may determine a strength for generating the wireless power field so as to keep the induced voltage at the receiver 208 below the threshold voltage. In particular, the transmitter 204 may adjust a transmit current (ITX) output to the antenna of the transmitter 204 to adjust the strength (e.g., power level) of the generated wireless power field. For example, in certain aspects, the transmitter 204 may ramp up the strength of the generated wireless power field (e.g., ramp up ITX) to the receiver 208 until the receiver 208 gets to over voltage protection mode, and then lower the strength (e.g., lower ITX) to efficiently transfer power to the receiver 208. To do this, however, the transmitter 204 needs to know that the receiver 208 is operating in over voltage protection mode.

In certain aspects, as discussed, the receiver 208 may communicate with the transmitter 204 on a separate communication channel 219 (e.g., Bluetooth, Zigbee, cellular, etc.). Accordingly, when the receiver 208 enters over voltage protection mode, it may signal on the communication channel 219 that it has entered over voltage protection mode and the transmitter 204 can adjust the wireless power field accordingly.

However, in certain aspects, a receiver 208 that implements over voltage protection may not include a battery or may have a dead battery, and therefore cannot actively signal to the transmitter 204 that the receiver 208 is coupled to, that the receiver 208 is in over voltage protection mode. For example, when in over voltage protection mode, the receiver 208 may not have power to run active communications circuits (e.g., Bluetooth, Zigbee, cellular, etc.) to communicate with the transmitter 204.

Accordingly, certain aspects relate to the transmitter 204 detecting the receiver 208 is in over voltage protection mode without the receiver 208 actively communicating with the transmitter 204. For example, when the receiver 208 enters over voltage protection mode, as discussed, it may be configured to short out an antenna of the receiver 208, or change the impedance of the resonator (e.g., transmitting element 352 and tuning circuit 360) in some manner (e.g., adjusting capacitance of tuning capacitors). This reduces or terminates power reception of the wireless power field by the receiver 208, which changes the reflected impedance seen by the transmitter 204 at the resonator (e.g., transmitting element 352 and tuning circuit 360) of the transmitter 204. In particular, the transmitter 204 can measure impedance loaded on the resonator of the transmitter 204 by the wireless charging field. As the power reception of the wireless power field by the receiver 208 decreases, the measured resistance at the transmitter 204 may decrease, and the reactance may increase. As the power reception of the wireless power field by the receiver 208 increases, the measured resistance at the transmitter 204 increase and the reactance may decrease. Changes in impedance (e.g., reactance and resistance) may be measured and correlated with changes in the power reception of the wireless power field.

Accordingly, in certain aspects, the transmitter 204 determines whether the receiver 208 is in over voltage protection mode or not based on the reflected impedance measured at the transmitter 204. In certain aspects, the transmitter 204 includes an impedance measuring circuit (e.g., coupled to or a part of controller 240) that measures the impedance (directly or indirectly) at the transmitter 204. For example, in certain aspects, the impedance measuring circuit is configured to directly measure the impedance at a resonator of the transmitter 204. In certain aspects, the impedance measuring circuit is configured to sample the DC power input to a power amplifier of the transmitter 204, which is indicative of the impedance change at the resonator of the transmitter 204 due to the power amplifier efficiency varying as the load impedance varies. For example, as the impedance increases, the DC power input (e.g., VD 225) to the power amplifier (e.g., driver 224) of the transmitter 204 increases due to the increased impedance. In certain aspects, the impedance measuring circuit is configured to measure the AC power to an AC/DC converter that generates the DC power input for the power amplifier of the transmitter 204. For example, as the impedance increases, the AC power output of the transmitter 204 increases due to the increased impedance.

Figure 5:
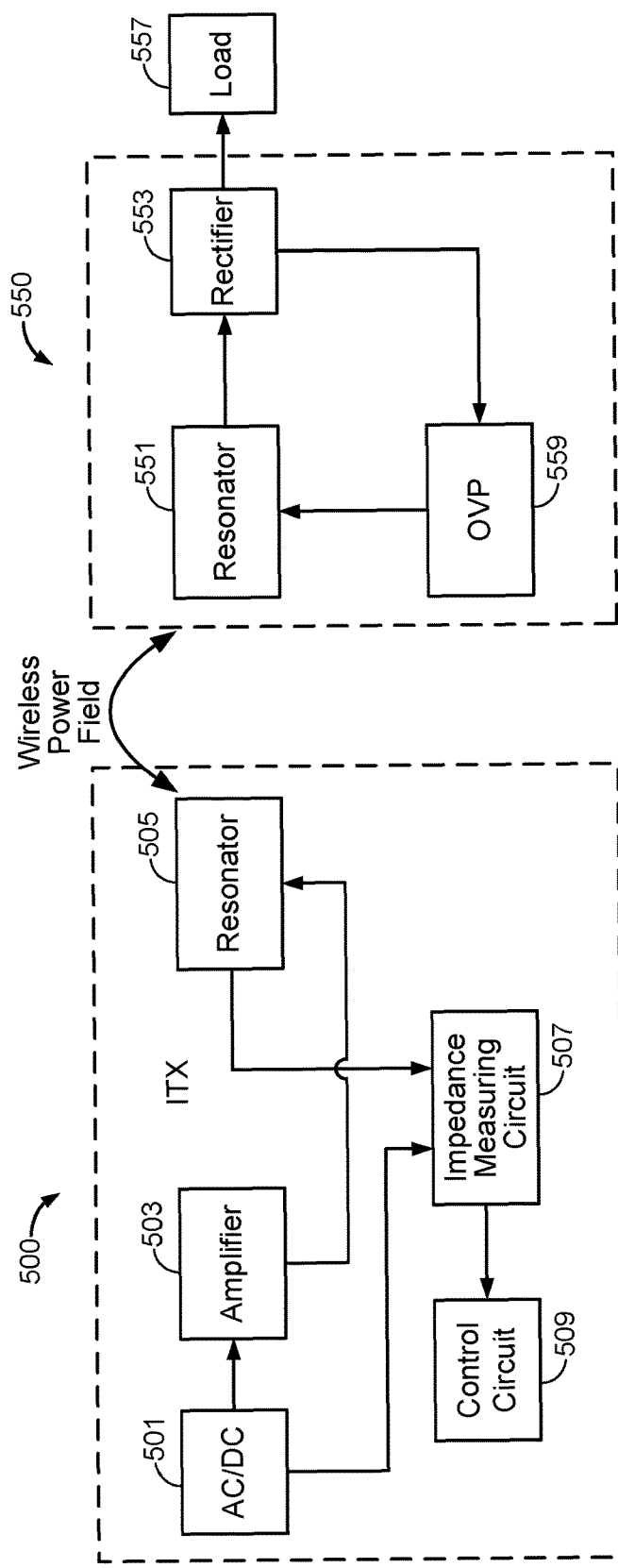
FIG. 5 is a block diagram of an example wireless power transmitter and wireless power receiver for detecting an over voltage protection state or mode, in accordance with illustrative aspects.

For example, FIG. 5 is a block diagram of an example wireless power transmitter 500 and wireless power receiver 550 for detecting an over voltage protection state or mode. As shown, the wireless power receiver 550 includes a resonator 551, a rectifier 553, a load 557, and an over voltage protection detection circuit 559. The wireless power transmitter 500 includes an AC/DC converter 501, an amplifier 503, a resonator 505, and an impedance measuring circuit 507 (e.g., impedance detector).

At the wireless power transmitter 500, the AC/DC converter 501 is configured to convert an AC power input to a DC power input (e.g., VD 225) for the amplifier 503 (e.g., driver 224). The amplifier 503 is coupled to the AC/DC converter 501 and is configured to generate a transmit current (ITX) and apply the current ITX to the resonator 505. Accordingly, the resonator 505, coupled to the amplifier 503, generates a wireless power field based on the current ITX.

At the wireless power receiver 550, the resonator 551 couples to the wireless power field generated by the resonator 505, thereby inducing a voltage on the resonator 551. The induced voltage is an AC signal. The resonator 551 is coupled to the rectifier 553, which converts the AC signal to a DC signal. The over voltage protection detection circuit 559 is coupled to the rectifier 553 (or the resonator 551) and determines if the detected voltage of the DC signal (or AC signal) is above a threshold voltage level. If the voltage is above the threshold, the over voltage protection detection circuit 559 changes an impedance (e.g., shorts an antenna or changes a tuning) of the resonator 551 to operate in over voltage protection mode, as discussed. Otherwise, the over voltage protection detection circuit 559 does not change the impedance.

At the wireless power transmitter 500, the change in impedance at the resonator 551 is reflected as a change in impedance at the resonator 505, as discussed. The impedance measuring circuit 507 measures the change in impedance at the resonator 505. For example, in certain aspects, the impedance measuring circuit 507 is directly coupled to the resonator 505 and detects a change in impedance. In certain aspects, the impedance measuring circuit 507 is coupled to the AC/DC converter 501 and detects changes in AC power input or DC power input. In certain aspects, the wireless power transmitter 500 determines if the wireless power receiver 550 is in over voltage protection mode based on the measured change in impedance by the impedance measuring circuit 507 as discussed further herein. In some embodiments, the wireless power transmitter 500 further includes a control circuit 509 (e.g., controller 240) for changing operation (e.g., current level ITX, strength of the wireless charging field, etc.) of the wireless power transmitter 500 based on the detection of over voltage protection mode, as further discussed herein.

In certain aspects, a wireless power transmitter (e.g., transmitter 204, 500, etc.) is configured to measure impedance (e.g., directly or indirectly, such as, by impedance measuring circuit 507) at a resonator of the wireless power transmitter. The wireless power transmitter is then configured to determine (e.g., by control circuit 509, controller 240, etc.) if over voltage protection is occurring (e.g., over voltage protection circuitry is active) at a wireless power receiver (e.g., receiver 208, 400, 550, etc.) coupled to a wireless power field generated by the wireless power transmitter based on characteristics of the measured impedance. For example, as discussed, when a wireless power receiver enters an over voltage protection state or mode, the induced voltage at the wireless power receiver decays (e.g., to below a threshold, such as below a threshold voltage for entering over voltage protection mode, or below a second threshold voltage that is lower than the threshold voltage for entering over voltage protection mode, where the entering over voltage protection mode threshold and exiting over voltage protection mode threshold are different to provide hysteresis for entering and exiting over voltage protection mode). The wireless power receiver then exits over voltage protection mode and resumes normal operation when the induced voltage has decayed below a threshold voltage for exiting over voltage protection mode. Further, if the strength of the wireless power field received by the wireless power receiver remains constant (e.g., wireless power transmitter does not modify the strength of the wireless power field, coupling, such as based on distance, remains constant between the wireless power transmitter and the wireless power receiver, etc.), the induced voltage at the wireless power receiver may again rise above the threshold voltage for entering over voltage protection mode, and the wireless power receiver may enter over voltage protection mode.

This cyclic entering and exiting of over voltage protection mode by the wireless power receiver causes the rise and fall of the induced voltage at the wireless power receiver to have a characteristic frequency, which may be based on certain parameters such as a RC time constant of the resonator of the wireless power receiver, a strength of the wireless power field emitted by the wireless power transmitter, and/or the threshold(s) for entering/exiting over voltage protection mode. As discussed, the reflected impedance at the resonator of the wireless power transmitter is also based on the induced voltage at the wireless power receiver. Accordingly, in certain aspects, the reflected impedance at the resonator of the wireless power transmitter will also rise and fall at the characteristic frequency when the wireless power receiver enters and exits over voltage protection mode as discussed. The wireless power transmitter may be configured to determine, or may be pre-programmed, based on the parameters for one or more particular wireless power receivers, with information regarding the characteristic frequency. Accordingly, the wireless power transmitter may determine (e.g., by control circuit 509, controller 240, etc.) if the wireless power receiver is under conditions (e.g., the signal strength from the wireless power transmitter is high enough) that cause an over voltage protection (e.g., cause the wireless power to enter an over voltage protection mode) by determining if the measure impedance at the resonator of the wireless power transmitter is changing at the characteristic frequency.

Figure 6:
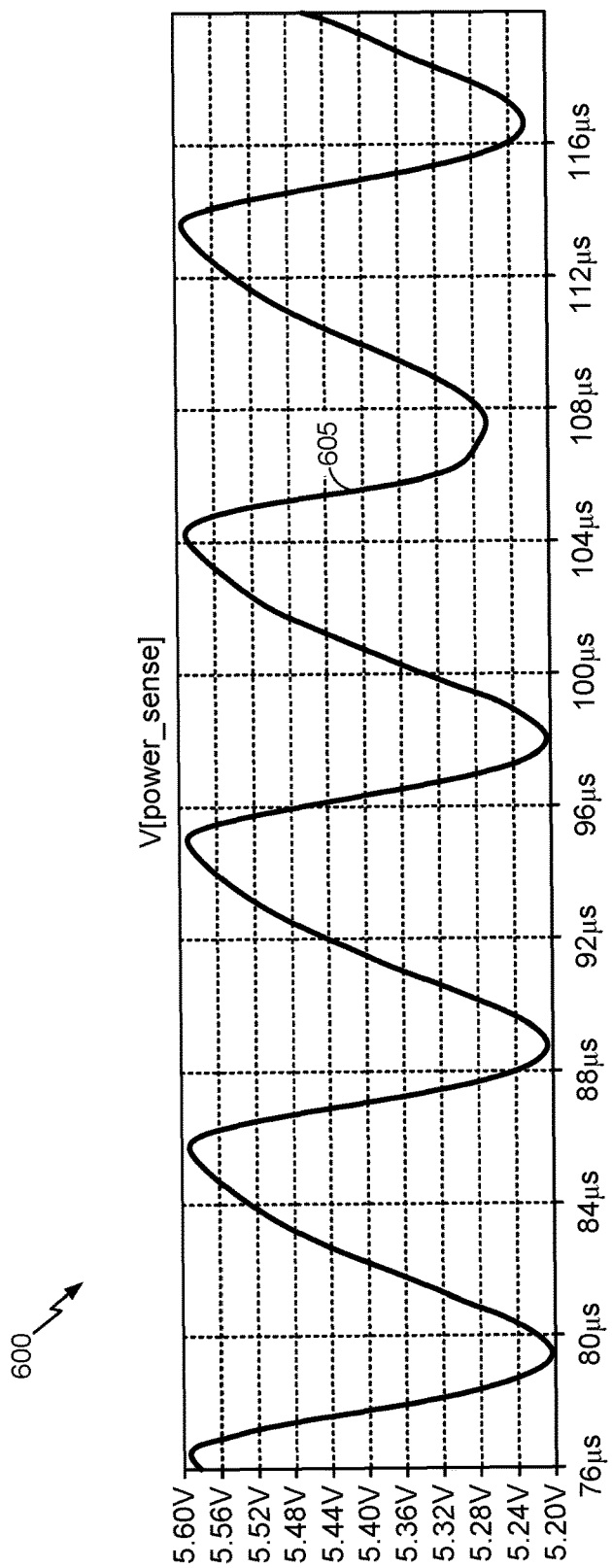
FIG. 6 illustrates a graph of the change in DC power input at a wireless power transmitter indicative of an over voltage protection condition, in accordance with illustrative aspects.

For example, FIG. 6 illustrates a graph 600 of the change in DC power input at a wireless power transmitter (e.g., wireless power transmitter 500) indicative of an over voltage protection condition. As discussed, the DC power input is an indirect measurement of impedance at the resonator of the wireless power transmitter. As shown, the X-axis represents time, and the Y-axis representing voltage of the DC power input. The DC power input signal 605, as shown, is periodic and has a characteristic frequency.

In some aspects, the wireless power receiver 550 may be configured to enhance detection of the change in impedance by the wireless power transmitter 500. For example, the magnitude of the change in impedance change at the wireless power transmitter 500 may be enhanced to make detection easier (e.g., utilizing less sensitive detection equipment/circuits). In particular, in certain aspects, the wireless power receiver 550 may be configured to, when close to entering over voltage protection mode (e.g., have an induced voltage below and within a threshold of the entering over voltage protection mode threshold), tune a resonant frequency of the resonator 551 of the wireless power receiver 550 (e.g., by changing capacitance, such as by adjusting capacitance of tuning capacitors, switching in/out tuning capacitors, etc.) closer to resonance to increase the amount of power dissipated on the resonator 551 of the wireless power receiver 550, and therefore increase the impedance change at the wireless power transmitter 500.

In some aspects, changes in the impedance at the wireless power transmitter 500 may occur for reasons other than the wireless power receiver 550 being in over voltage protection mode, though the impedance change may not then occur at the characteristic frequency discussed. However, in some aspects, to alternatively or further determine whether the impedance change at the wireless power transmitter 500 is due to the wireless power receiver 550 being in over voltage protection mode, the wireless power transmitter 500 (e.g., by control circuit 509, controller 240, etc.) may vary its transmission current (e.g., ITX) for generating the wireless power field (i.e., adjust the strength of the wireless field) and detect any corresponding change in impedance. If the wireless power transmitter 500 determines (e.g., by control circuit 509, controller 240, etc.) that the change in impedance correlates with the variation in transmission current (e.g., if the frequency change in impedance occurs when the transmission current is changed, and/or if the frequency change remains constant while transmission current is constant) the wireless power transmitter 500 determines that the wireless power receiver 550 is in over voltage protection mode. In some aspects, the varying of transmission current to further determine whether the wireless power receiver 550 is in over voltage protection mode is performed only after the wireless power transmitter 500 detects an impedance change at the wireless power transmitter 500 at the characteristic frequency associated with the wireless power receiver 550.

In some aspects, the wireless power receiver 550 may be configured to have a variable over voltage protection threshold, such as according to a pattern that is known by the wireless power transmitter 500. For example, the wireless power receiver 550 may alternate between two or more different over voltage protection thresholds according to a pattern (e.g., two thresholds with one threshold being 25% lower than the other threshold). Accordingly, the induced voltage at the wireless power receiver 550 when entering and exiting over voltage protection mode would have a distinct pattern (e.g., a pattern of different characteristic frequencies and/or magnitudes at alternating periods, such as a first time period and a second time period) corresponding to the variable over voltage protection threshold. Therefore, if the wireless power transmitter 500 detects the same distinct pattern in the impedance at the wireless power transmitter 500 (e.g., at each of the time periods), the wireless power transmitter 500 determines the wireless power receiver 550 is in over voltage protection mode. In some aspects, the wireless power receiver 550 may be configured to change its resonance tuning prior to entering over voltage protection mode according to a specific pattern to change the induced voltage according to the specific pattern. Accordingly, the wireless power transmitter 500 can detect the same pattern of change in the impedance at the wireless power transmitter 500, and determine the wireless power receiver 550 is in over voltage protection.

In certain aspects, once the wireless power transmitter 500 determines the wireless power receiver 550 is in over voltage protection mode it may decrease a strength of the wireless power field (e.g., reduce ITX) to prevent the wireless power receiver 550 from entering over voltage protection mode. For example, as discussed, the wireless power transmitter 500 may ramp up the strength of the generated wireless power field from an initial strength (e.g., ramp up ITX from an initial ITX) to the wireless power receiver 550 until the wireless power transmitter 500 detects the wireless power receiver 550 is in over voltage protection mode (according to the techniques described herein), and then lower the strength (e.g., lower ITX) (e.g., to just below the strength that cause the wireless power receiver 550 to enter over voltage protection) to efficiently transfer power to the wireless power receiver 550. The change in the strength of the wireless power field generated by the resonator 505 may be controlled, for example, by a controller such as the control circuit 509. For example, where the wireless power receiver 550 powers a medical implant (e.g., is part of the implant), in certain aspects, the induced voltage at the wireless power receiver 550 due to coupling with a wireless field generated by the wireless power transmitter 500 may be variable. For instance, the coupling between the wireless power receiver 550 and the wireless power transmitter 500 may vary based on distance (e.g., depth of implant in tissue) or material (e.g., characteristics of tissue) between the wireless power receiver 550 and the wireless power transmitter 500, making it difficult to determine the correct power level to operate the wireless power transmitter 500 to transfer the correct amount of power to the wireless power receiver 550. Accordingly, the wireless power transmitter 500 may slowly ramp up strength of the generated wireless power field (e.g., at fixed increments) and then lower the strength when it detects the wireless power receiver 550 is in over voltage protection mode to safely ensure the correct amount of power is transferred to the wireless power receiver 550 to operate the wireless power receiver 550, and not too much power which may harm the wireless power receiver 550 and/or tissue.

Figure 7:
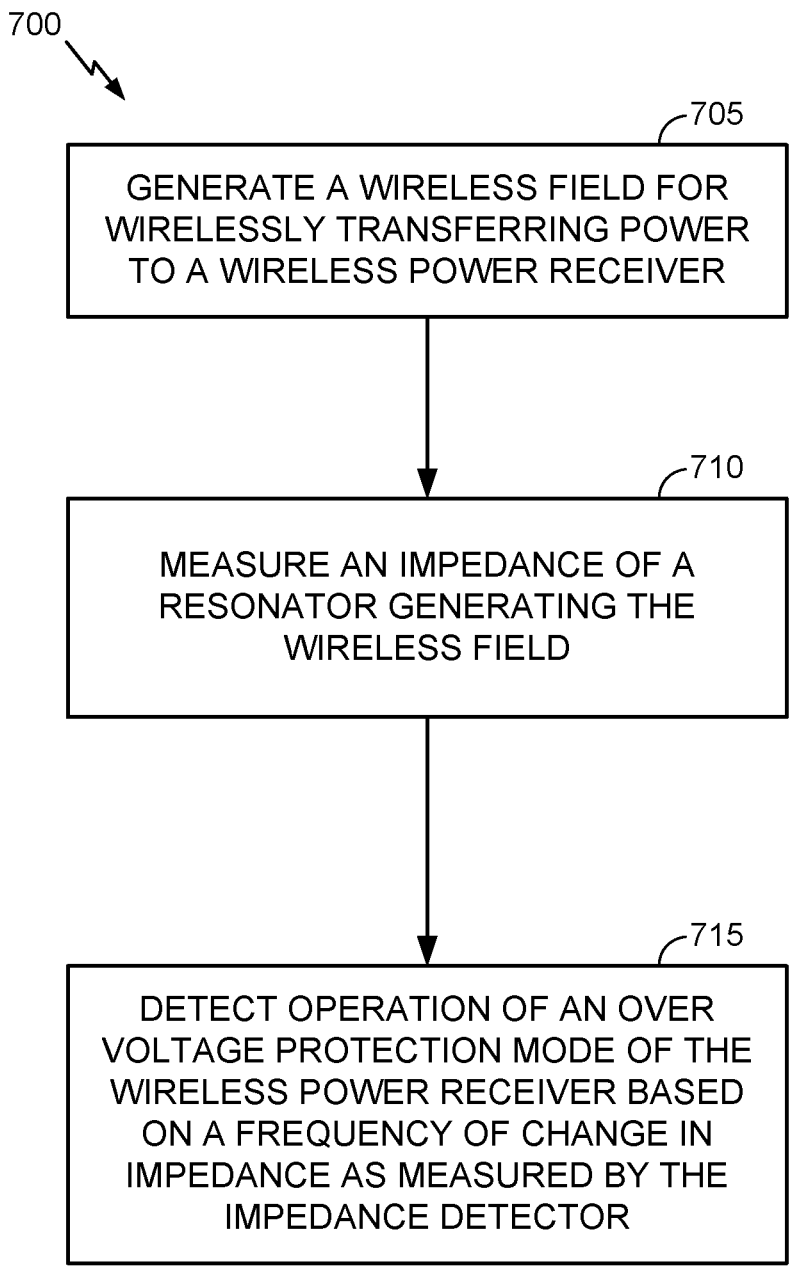
FIG. 7 is a flowchart of example operations for detecting an over voltage protection state or mode, in accordance with certain aspects of the present disclosure.

FIG. 7 is a flowchart of example operations 700 for detecting over voltage protection, in accordance with certain aspects of the present disclosure. Operations 700 are described with respect to wireless power transmitter 500 and wireless power receiver 550, however, operations 700 may be performed by another suitable wireless power transmitter and/or wireless power receiver.

At 705, a resonator 505 of a wireless power transmitter 500 generates a wireless field for wirelessly transferring power to a wireless power receiver. For example, in certain aspects, the wireless power transmitter 500 generates a current (ITX) input to a resonator 505 at the wireless power transmitter 500 to generate a wireless field to transfer power to a wireless power receiver 550. The wireless power receiver 550 couples to the wireless field, which induces a voltage on a resonator 551 of the wireless power receiver 550.

At 710, an impedance detector (e.g., impedance measuring circuit 507) of the wireless power transmitter 500 measures an impedance at a resonator 505 of the wireless power transmitter 500. In particular, as discussed, in certain aspects the coupling of the wireless field by the wireless power receiver 550, and the induced voltage at the wireless power receiver 550, may be reflected in the impedance at the wireless power transmitter 500.

At 715, a controller (e.g., control circuit 509) of the wireless power transmitter 500 determines whether the wireless power receiver 550 is operating in an over voltage protection mode based on a frequency of change in impedance as measured by the impedance detector. In particular, as discussed, the characteristic frequency of change in the induced voltage at the wireless power receiver 550, which is reflected in the impedance at the wireless power transmitter 500, may be indicative of an over voltage protection mode at the wireless power receiver 550.

The method of FIG. 7 may be used to operate/control any of wireless power transmitters 104, 204, 500, or any other suitable wireless power transmitter.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC with the processor, the bus interface, the user interface in the case of an access terminal), supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A wireless power transmitter comprising:
   a resonator configured to generate a wireless field for wirelessly transferring power to a wireless power receiver;
   an impedance detector configured to measure an impedance of the resonator; and
   a controller configured to detect operation of an over voltage protection mode of the wireless power receiver based on a frequency of change in impedance as measured by the impedance detector, wherein the controller is further configured to adjust a strength of the wireless field and detect a correlation between the frequency of change in impedance and the adjusted strength of the wireless field, wherein the detected operation of the over voltage protection mode is based on the detected correlation.

2. The wireless power transmitter of claim 1, wherein the controller is configured to adjust the strength of the wireless field in response to determining the frequency of change in impedance is at a first characteristic frequency.

3. The wireless power transmitter of claim 1, wherein the frequency of change is based on at least one of a RC constant of the wireless power receiver, the strength of the wireless field, a threshold voltage for entering the over voltage protection mode, or a threshold voltage for exiting the over voltage protection mode.

4. The wireless power transmitter of claim 1, wherein the controller is configured to detect operation of the over voltage protection mode of the wireless power receiver when the frequency of change in impedance as measured by the impedance detector corresponds to a pattern of change relating to a variable over voltage protection threshold of the wireless power receiver.

5. The wireless power transmitter of claim 4, wherein the pattern of change relating to the variable over voltage protection threshold comprises a first frequency of change in impedance for a first period corresponding to a first threshold of the variable over voltage protection threshold, and a second frequency of change in impedance for a second period corresponding to a second threshold of the variable over voltage protection threshold.

6. The wireless power transmitter of claim 1, wherein the controller is configured to adjust the strength of the wireless field based on detecting operation of the over voltage protection mode.

7. The wireless power transmitter of claim 1, wherein the impedance detector is configured to measure the impedance of the resonator by directly measuring the impedance of the resonator.

8. The wireless power transmitter of claim 1, wherein the impedance detector is configured to indirectly measure the impedance of the resonator by measuring a DC power input to a power amplifier of the wireless power transmitter.

9. The wireless power transmitter of claim 1, wherein the impedance detector is configured to indirectly measure the impedance of the resonator by measuring an AC power input to an AC/DC converter of the wireless power transmitter.

10. The wireless power transmitter of claim 1, wherein the controller is configured to determine a characteristic frequency of an induced voltage at the wireless power receiver when entering and exiting the over voltage protection mode based on one or more parameters of the wireless power receiver and detect the over voltage protection mode of the wireless power receiver when the frequency of change in impedance matches the characteristic frequency.

11. The wireless power transmitter of claim 1, wherein the controller is configured to:
control the resonator to generate the wireless field with a power level starting at an initial power level; and
control the resonator to increase the power level of the generated wireless field above the initial power level until the controller detects operation of the over voltage protection mode.

12. The wireless power transmitter of claim 11, wherein the controller is configured to:
control the resonator to decrease the power level of the generated wireless field in response to detecting operation of the over voltage protection mode.

13. A method for detecting an over voltage protection mode of a wireless power receiver, the method comprising:
generating a wireless field for wirelessly transferring power to the wireless power receiver using a resonator;
measuring an impedance of the resonator;
detecting operation of the over voltage protection mode of the wireless power receiver based on a frequency of change of the measured impedance; and
adjusting a strength of the wireless field and detecting a correlation between the frequency of change of the measured impedance and the adjusted strength of the wireless field, wherein detecting operation of the over voltage protection mode is based on the detected correlation.

14. The method of claim 13, further comprising adjusting the strength of the wireless field in response to determining the frequency of change of the measured impedance is at a first characteristic frequency.

15. The method of claim 13, wherein the frequency of change is based on at least one of a RC constant of the wireless power receiver, the strength of the wireless field, a threshold voltage for entering the over voltage protection mode, or a threshold voltage for exiting the over voltage protection mode.

16. The method of claim 13, further comprising detecting operation of the over voltage protection mode of the wireless power receiver when the frequency of change of the measured impedance corresponds to a pattern of change relating to a variable over voltage protection threshold of the wireless power receiver.

17. The method of claim 16, wherein the pattern of change relating to the variable over voltage protection threshold comprises a first frequency of change of the measured impedance for a first period corresponding to a first threshold of the variable over voltage protection threshold, and a second frequency of change of the measured impedance for a second period corresponding to a second threshold of the variable over voltage protection threshold.

18. The method of claim 13, further comprising adjusting the strength of the wireless field based on detecting operation of the over voltage protection mode.

19. The method of claim 13, further comprising measuring the impedance of the resonator by directly measuring the impedance of the resonator.

20. The method of claim 13, further comprising measuring the impedance of the resonator by indirectly measuring the impedance of the resonator by measuring a DC power input to a power amplifier coupled to the resonator.

21. The method of claim 13, further comprising measuring the impedance of the resonator by indirectly measuring the impedance of the resonator by measuring an AC power input to an AC/DC converter coupled to the resonator.

22. The method of claim 13, further comprising determining a characteristic frequency of an induced voltage at the wireless power receiver when entering and exiting the over voltage protection mode based on one or more parameters of the wireless power receiver and detecting the over voltage protection mode of the wireless power receiver when the frequency of change of the measured impedance matches the characteristic frequency.

23. The method of claim 13, wherein generating the wireless field comprises:
generating the wireless field with a power level starting at an initial power level; and
increasing the power level of the generated wireless field above the initial power level until detecting operation of the over voltage protection mode.

24. The method of claim 23; wherein generating the wireless field comprises:
decreasing the power level of the generated wireless field in response to detecting operation of the over voltage protection mode.

25. A wireless power transmitter comprising:
means for generating a wireless field for wirelessly transferring power to a wireless power receiver;
means for measuring an impedance of the means for generating;
means for detecting operation of an over voltage protection mode of the wireless power receiver based on a frequency of change of the measured impedance; and
means for adjusting a strength of the wireless field and means for detecting a correlation between the frequency of change of the measured impedance and the adjusted strength of the wireless field, wherein detecting operation of the over voltage protection mode is based on the detected correlation.

26. The wireless power transmitter of claim 25, further comprising means for adjusting the strength of the wireless field in response to determining the frequency of change of the measured impedance is at a first characteristic frequency.

27. The wireless power transmitter of claim 25, wherein the frequency of change is based on at least one of a RC constant of the wireless power receiver, the strength of the wireless field, a threshold voltage for entering the over voltage protection mode, or a threshold voltage for exiting the over voltage protection mode.

* * * * *